United States Patent [19]

Gerand et al.

[11] Patent Number: 5,747,193

[45] Date of Patent: May 5, 1998

[54] PROCESS FOR SYNTHESIZING LIXMNY04 INTERCALATION COMPOUNDS

[75] Inventors: Bernard Gerand; Dominique Larcher, both of Amiens, France; Jean-Marie Tarascon, Martinsville, N.J.

[73] Assignee: Bell Communications Research, Inc., Morristown, N.J.

[21] Appl. No.: 682,817

[22] Filed: Jul. 11, 1996

[51] Int. Cl.[6] .................................................. H01M 4/50
[52] U.S. Cl. ........................ 429/224; 423/49; 423/599
[58] Field of Search ................. 423/49, 599; 429/224

[56] References Cited

U.S. PATENT DOCUMENTS

| | | | |
|---|---|---|---|
| 4,959,282 | 9/1990 | Dahn et al. | 423/49 X |
| 5,135,732 | 8/1992 | Barboux et al. | 423/49 X |
| 5,443,929 | 8/1995 | Yamamoto et al. | 429/224 |
| 5,605,773 | 2/1997 | Ellgen | 429/224 X |

*Primary Examiner*—Stephen Kalafut
*Attorney, Agent, or Firm*—Joseph Giordano; David Hey; Loria B. Yeadon

[57] ABSTRACT

A novel process for making $Li_xMn_yO_4$ intercalation compounds, wherein $0<x\leq2$ and $1.7\leq y\leq2$, comprises the steps of: (1) synthesizing a lithiated manganese oxide precursor by reacting lithium hydroxide, manganese dioxide, and one or more polyhydric alcohols; and (2) heat-treating the lithiated manganese oxide precursor. The intercalation compounds are effectively employed as active components of positive electrodes in rechargeable lithiated intercalation battery cells.

14 Claims, 5 Drawing Sheets

PROCESS FOR SYNTHESIZING LIXMNY04 INTERCALATION COMPOUNDS

BACKGROUND OF THE INVENTION

The present invention relates to a novel method for synthesizing $Li_xMn_yO_4$ intercalation compounds wherein $0<x\leq2$ and $1.7\leq y\leq2$; to novel lithiated manganese oxide precursors useful in the synthesis of such an intercalation compound; and to lithium ion secondary batteries comprising such intercalation compounds.

Lithium ion secondary battery cells in which the active component of the positive electrode comprises a $LiCoO_2$, $LiNiO_2$, or $LiMn_2O_4$ intercalation compound and the active component of the negative electrode comprises a carbon compound are of significant commercial value because of the large electrochemical capacities of such cells. $LiCoO_2$ and $LiNiO_2$ have one lithium atom per transition metal atom, resulting in a theoretical capacity of 275 mAh/g. Unfortunately, it is not possible to remove reversibly all the lithium ions from these positive electrode materials. In practical applications, it thus appears that only about 0.5 lithium ions per transition metal atom can be reversibly removed without affecting electrochemical capacities. This represents a capacity of only 140 mAh/g.

Likewise, only about 0.5 lithium ions per transition metal atom can be reversibly removed from $LiMn_2O_4$. Thus, since $LiNiO_2$, $LiCoO_2$ and $LiMn_2O_4$ all exhibit similar electrochemical capacity when employed in lithium ion cells as positive electrode materials, it would appear that these materials are equally suitable as active positive electrode materials. However, when $LiNiO_2$, $LiCoO_2$ and $LiMn_2O_4$ are compared with regard to natural abundance, toxicity, commercial cost, stability of the delithiated phase of the various materials, and recyclability, the lithium manganese oxide spinel, $LiMn_2O_4$, offers significantly greater advantages as a positive electrode in secondary batteries, relative to either $LiNiO_2$ and $LiCoO_2$.

Conventionally, $LiMn_2O_4$, and particularly $Li_xMn_yO_4$ wherein $0<x\leq2$ and $1.7\leq y\leq2$, have been prepared by a solid-state annealing reaction between one or more lithium salts and one or more manganese oxides at a temperature of about 800° C. This annealing process comprised several mechanical grinding steps and concluded with an extremely slow cooling operation. For example, desirable electrochemical characteristics for a lithiated manganese oxide cell had been obtained by using $Li_{1.15}Mn_{1.95}O_4$ prepared from a stoichiometric mixture of $Li_2CO_3$ and $MnO_2$. This stoichiometric mixture was heated at 800° C. for 6 days, subjected to two sequential cooling-grinding-heating operations, and finally treated in a very slow cooling step. From an industrial perspective, this process is time consuming, energetically expensive, and inefficient. Accordingly, there was a need for a faster, less energy-intensive, and more efficient synthesis of preferred $Li_xMn_yO4$ intercalation compounds, wherein $0<x\leq2$ and $1.7\leq y\leq2$.

SUMMARY OF THE INVENTION

An object of the present invention is to provide a novel process for synthesizing $Li_xMn_yO_4$ intercalation compounds wherein $0<x\leq2$ and $1.7\leq y\leq2$.

A further object of the present invention is to provide a process for synthesizing $Li_xMn_yO_4$ intercalation compounds, wherein $0<x\leq2$ and $1.7\leq y\leq2$, which is much less time-consuming than the conventional process.

A still further object of the present invention is to provide a process for synthesizing $Li_xMn_yO_4$ intercalation compounds, wherein $0<x\leq2$ and $1.7\leq y\leq2$, which obviates the grinding steps of the conventional process.

Another object of the present invention is to provide novel rechargeable lithiated intercalation battery cells comprising a negative electrode, a nonaqueous electrolyte, and a positive electrode, wherein the positive electrode comprises a $Li_xMn_yO_4$ intercalation compound, wherein $0<x\leq2$ and $1.7\leq y\leq2$, produced by a novel process.

Another object of the present invention is to provide a novel lithiated manganese oxide precursor, useful in the synthesis of $Li_xMn_yO_4$ wherein $0<x\leq2$ and $1.7\leq y\leq2$.

These objects, among others, have been achieved in the present invention by a novel process for synthesizing $Li_xMn_yO_4$, wherein $0<x\leq2$ and $1.7\leq y\leq2$, which comprises the steps of synthesizing a lithiated manganese oxide precursor by reacting lithium hydroxide and manganese dioxide in one or more polyhydric alcohol solvents, and heating the lithiated manganese oxide precursor to obtain $Li_xMn_yO_4$ wherein $0<x\leq2$ and $1.7\leq y\leq2$. It is believed that the lithiated manganese oxide precursor is thermally unstable and metamorphoses through an exothermic reaction, which may include combustion of the organic solvent at temperatures of about 250° C.

BRIEF DESCRIPTION OF THE DRAWING

The present invention will be described with reference to the accompanying drawing of which.

DESCRIPTION OF THE INVENTION

Figure 1:
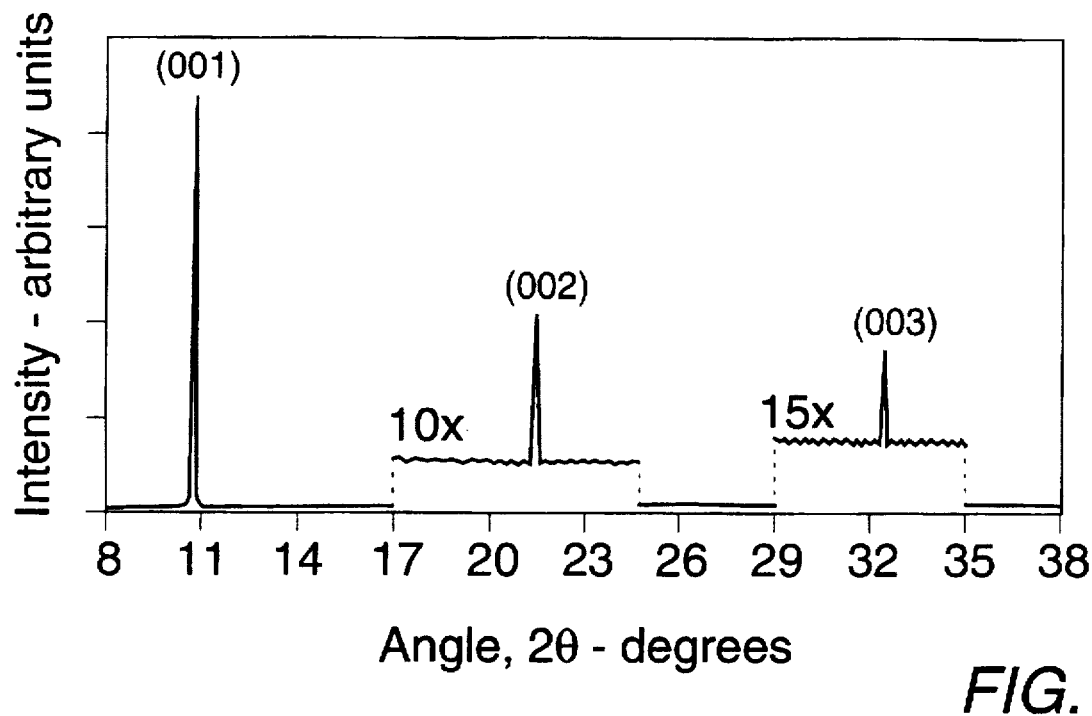
FIG. 1 is an X-ray diffraction pattern of a lithiated manganese oxide precursor prepared from $LiOH.H_2O$, $MnO_2$, and ethylene glycol according to the present invention.

The present invention provides a novel method for synthesizing a lithiated manganese oxide intercalation compound, namely $Li_xMn_yO_4$ wherein $0<x\leq2$ and $1.7\leq y\leq2$, and a novel lithiated manganese oxide precursor useful in preparing such a compound.

Lithiated manganese oxide, which is employed as the active component of the positive electrodes of secondary cells, has conventionally been manufactured by standard inorganic synthesis methods. These methods for synthesizing metal oxides include formation of a metal hydroxide, followed by pyrolysis; pyrolysis of organic salts; and hydrolysis of alcoholates. Such reactions are carried out either in the solid state or in aqueous solutions. When lithiated manganese oxide is manufactured by such classic inorganic methods, the crude material requires additional time consuming, energetically expensive, and inefficient processing steps. The present invention overcomes the drawbacks of the conventional synthesis in a process comprising the reaction of a lithium salt and an inorganic manganese compound in a polyol solvent to yield an organometallic precursor which upon heat treatment provides a superior intercalation electrode compound, viz., $Li_xMn_yO4$ wherein $0<x\leq 2$ and $1.7\leq y\leq 2$.

The present synthesis of lithiated manganese oxide is essentially a two-stage process comprising (1) an initial synthesis of a lithiated manganese oxide precursor and (2) subsequent precursor heat treatment. In the first stage, a mixture of manganese dioxide and lithium hydroxide is reacted in a polyol solvent. Suitable polyol solvents include ethylene glycol, 1,3-propanediol, 1,2-propanediol, glycerol, and pentaerythritol. In a preferred embodiment of the present invention, ethylene glycol is employed as the polyol, or polyhydric alcohol. In addition, either lithium hydroxide or the monohydrate form of lithium hydroxide may be used. After the reaction mixture has been held at about 160° C. for a period of about 10 to 25 hours, it is cooled to room temperature (approximately 20° C.) over a period of about 2 to 3 hours and filtered to separate the precipitate which has formed during the course of the synthesis. The precipitate is then washed with an appropriate solvent, such as acetone, and dried under vacuum to yield the lithiated manganese oxide precursor.

In the second stage of the synthesis process, the lithiated manganese oxide precursor is heat-treated to yield a physically and mechanically superior $Li_xMn_yO_4$ wherein $0<x\leq 2$ and $1.7\leq y\leq 2$. This heat treatment is carried out in three steps. In an initial heating step, the precursor material is heated from about room temperature to about 250° C. at a moderate rate of temperature increase, ranging from about 5° C./hour to 15° C./hour, preferably about 10° C./hour. The material is maintained at this temperature for a period of time ranging from about 5 hours to 15 hours, preferably about 10 hours. In the second step, the material is further heated to about 800° C. at a slightly faster rate of temperature increase, ranging from about 0.5° C./minute to 2° C./minute, preferably about 1° C./minute, and is maintained at that temperature for about 20 hours to 30 hours, preferably about 24 hours. During the final step, the material is cooled to room temperature at a moderate rate ranging from about 0.5° C./minute to 2° C./minute, preferably about 1° C./minute.

EXAMPLE 1

A lithiated manganese oxide intercalation compound was prepared according to the present invention in the following manner. 8.7 g EMD MnO2 and 5.46 g $LiOH.H_2O$ powders were mixed at room temperature and then dissolved in 100 ml of ethylene glycol while being increasingly heated at reflux in a glass vessel at a rate of about 1° C./minute from room temperature to about 160° C. with mechanical stirring. The mixture was maintained at this reaction temperature for about 17 hours and was thereafter cooled to room temperature (about 20° C.) at a rate of about 1° C./minute. The synthesis reaction produced a precipitate which was separated by filtration with a glass fiber filter, was washed with about 100 ml acetone, and dried under vacuum at room temperature for about 10 hours to obtain the lithiated manganese oxide precursor. Precursors were similarly prepared with a variety of other hydroxide salts, specifically potassium, sodium, aluminum, and calcium hydroxides and with a variety of different polyhydric alcohols, specifically glycerol, 1,3-propanediol, and 1,2-propanediol.

The $LiOH.H_2O/MnO_2$/ethylene glycol precursor material was heated from room temperature to about 250° C. at about 10° C./hour. This moderate rate of temperature increase was employed so as to avoid rapid combustion of the organic components of the lithiated manganese oxide precursor. The material was then maintained at this temperature for a period of about 10 hours and was then further heated at a slightly faster rate of about 1° C./minute to about 800° C. where it was maintained for about 24 hours. The material was then cooled to room temperature at a moderate rate of about 1° C./minute.

Figure 2:
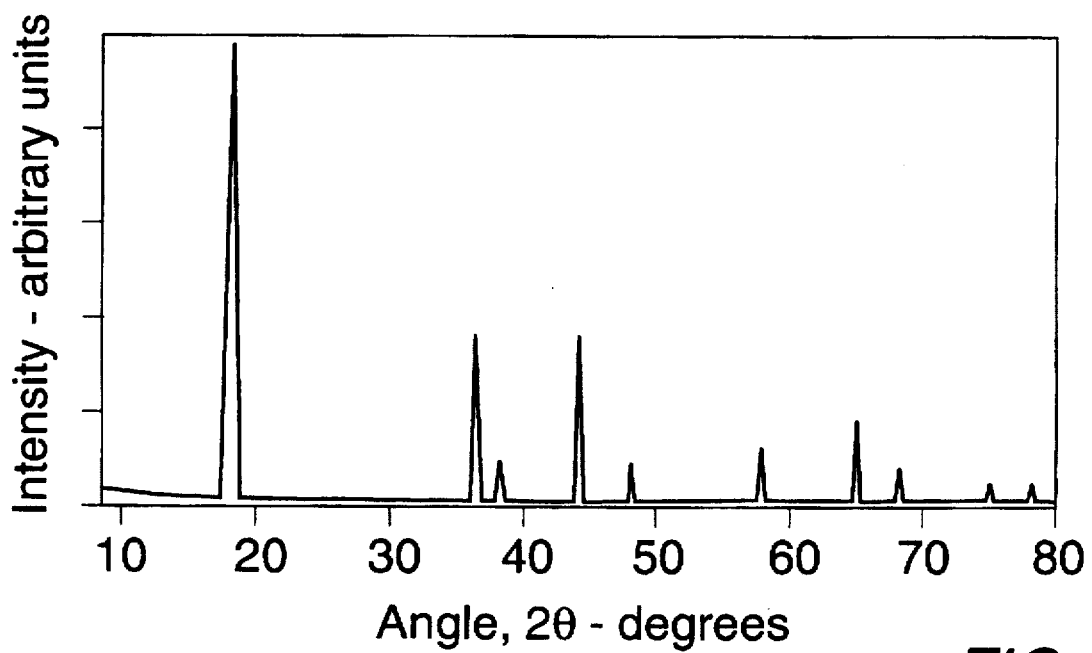
FIG. 2 presents the X-ray diffraction pattern of $Li_{1.09}Mn_{1.91}O_4$ prepared according to the present invention.

X-ray diffraction tests using CuK$\alpha$ radiation were conducted to characterize the lithiated manganese oxide precursor and the resultant $Li_xMn_yO_4$ intercalation compound. The graph of FIG. 1 reveals that the predominant characteristics of the precursor pattern are 001, 002, and 003 lines, with the peaks occurring at 2$\Theta$ angles of approximately 10°, 21°, and 32°, respectively. Due to the preferential orientation of the precursor powder (large platelets), only the 001 line, which is significantly the strongest, can be readily observed on a moderate pattern scale. The X-ray diffraction pattern of the $Li_{1.09}Mn_{1.91}O_4$ compound obtained from the above process is shown in FIG. 2 and reveals a space group of Fd$_3$m with a=8.225 Å and V=556.43 Å$^3$.

Figure 3:
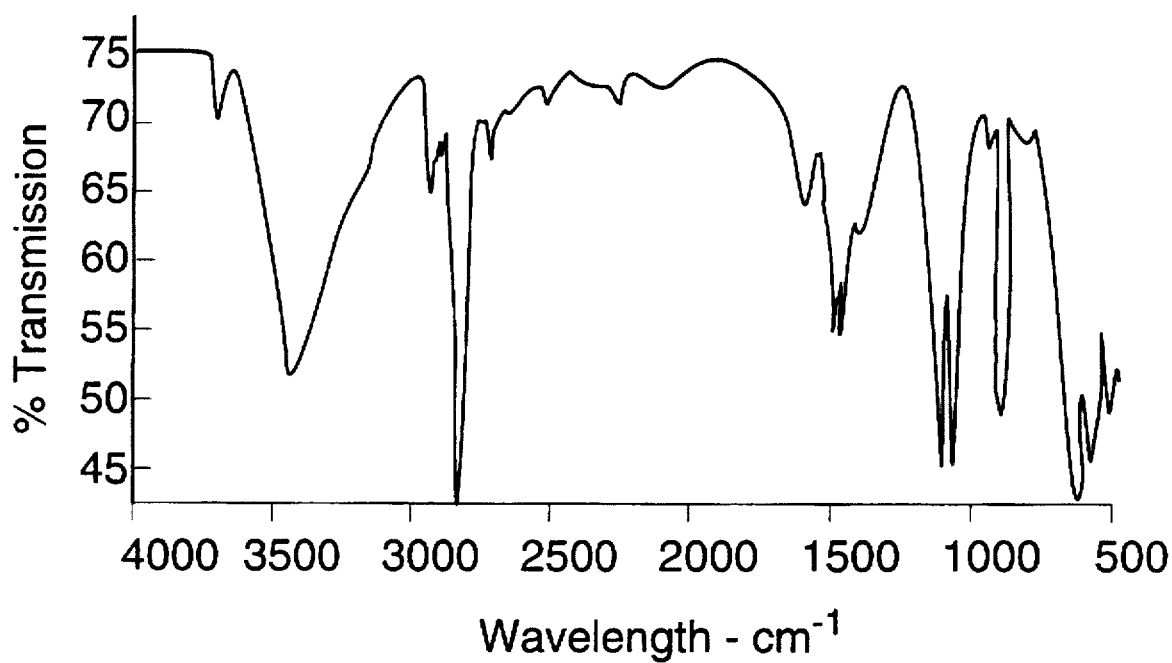
FIG. 3 is an infrared spectrum of the lithiated manganese oxide precursor prepared from $LiOH.H_2O$, $MnO_2$, and ethylene glycol.
Figure 4:
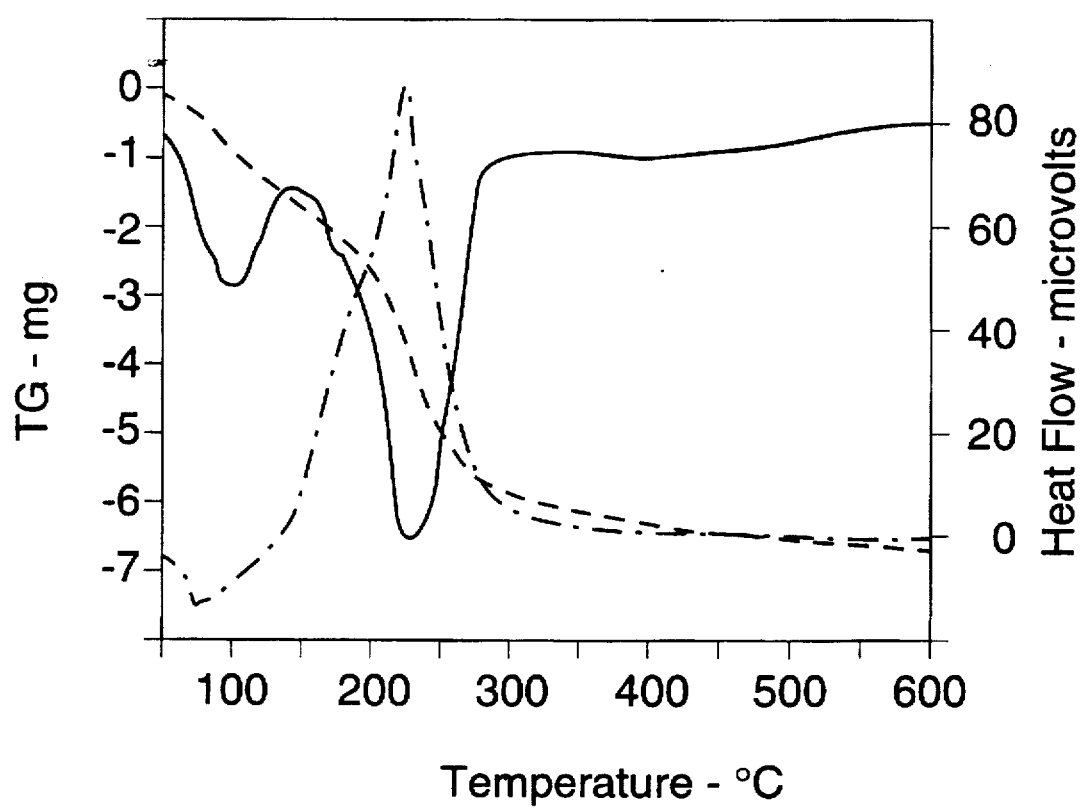
FIG. 4 is a thermogravimetric and calorimetric analysis of the lithiated manganese oxide precursor prepared from $LiOH.H_2O$, $MnO_2$, and ethylene glycol.

To further characterize the lithiated manganese oxide precursor the material was examined with infrared spectroscopy, as well as thermogravimetric and calorimetric analysis. In the infrared (IR) spectrum of FIG. 3, $CH_2$ stretching is observed in the 2800 to 2950 cm$^{-1}$ region and C—C and C—O stretching is observed in the 1000–1100 cm$^{-1}$ region. Thermogravimetric and calorimetric analysis of the lithiated manganese oxide precursor was conducted under air flow at a heating rate of 5° C./minute. The resulting curve of FIG. 4 reveals that weight losses occur predominantly at about 90° C., at about 230° C. with a large exothermic peak resulting from combustion of the organic component, and at about 400° C.

EXAMPLE 2

Figure 5:
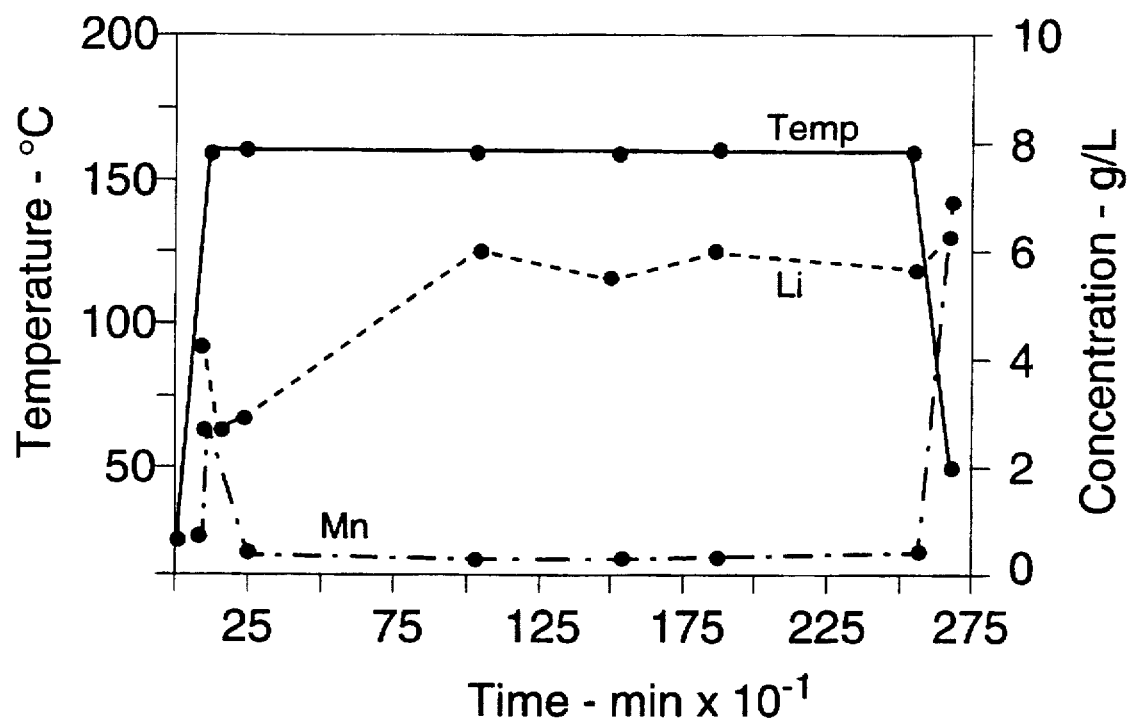
FIG. 5 is a chart depicting changes in the concentration of manganese and lithium during the synthesis of the lithiated manganese oxide precursor.

To further investigate the synthesis of the lithiated manganese oxide precursor, changes in the concentration of manganese and lithium in a mixture as prepared in Example 1 were monitored as a function of time during a reaction period extending up to about 40 hours. The mixture was heated to 160° C. at a rate of 1° C./minute, maintained at 160° C. for 2425 minutes, and then cooled to 60° C. at a rate of 1° C./minute. During this procedure, 5 mL samples of the mixture were withdrawn at times of about 50, 75, 100, 150, 200, 250, 400, 1050, 1580, 1900, and 2575 minutes after starting the heating to 160° C., and a final sample was withdrawn after the mixture had cooled to 50° C. Each of these samples was placed in a test tube and centrifuged, and the supernatant was separated and centrifuged a second time. The resulting supernatant from the second centrifugation was then mixed with distilled water and the concentrations of manganese and lithium in these samples of the solution were measured by atomic absorption. The concentrations and corresponding temperatures are shown in FIG. 5.

EXAMPLE 3

Figure 6:
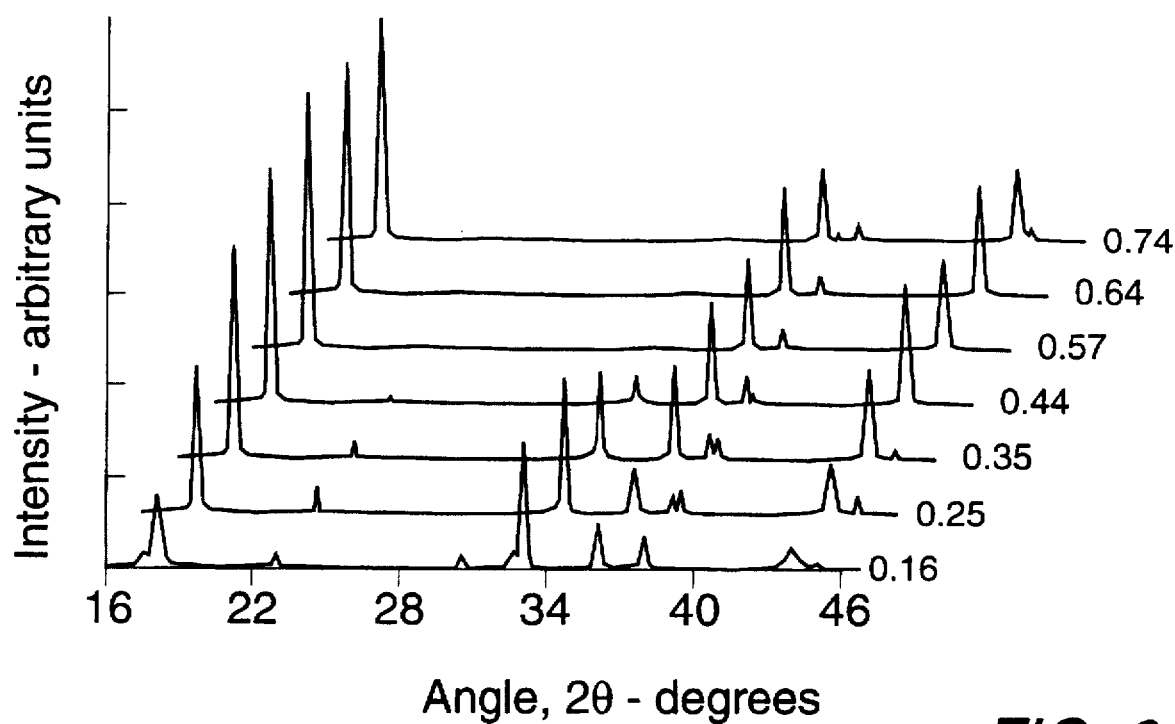
FIG. 6 is an overlay of the X-ray patterns using CuKα radiation of various $Li_xMn_yO_4$ compounds prepared from $LiOH.H_2O/MnO_2$/ethylene glycol precursors, in which the Li/Mn precursor ratio ranged from about 0.16 to about 0.74.

In order to examine the chemical and physical transformation of the lithiated manganese oxide precursor during the second-stage heat treatment, such materials synthesized at various ratios of lithium to manganese were analyzed by means of X-ray diffraction using CuKα radiation. Mixtures of selected ratios of $MnO_2$ and $LiOH \cdot H_2O$ were prepared and heated in ethylene glycol as described in Example 1. The resulting precipitates were filtered, washed, and dried and then heated to about 250° C. and maintained at that temperature for about 10 hours. The materials were then heated further to about 800° C. where they were held for about 20 hours before being cooled to room temperature. The resultant compounds were then characterized by means of X-ray diffraction using CuKα radiation to provide the patterns shown in FIG. 6.

From these patterns it was determined that a Li/Mn precursor ratio of about 0.16 provided a lithiated manganese oxide comprising a mixture of $Li_xMn_yO_4$, $Mn_2O_3$, and $Mn_3O_4$. From increasing Li/Mn precursor ratios up to about 0.45, the resultant lithiated manganese oxide material comprised a mixture of $Li_xMn_yO_4$ and $Mn_2O_3$. Further increasing Li/Mn precursor ratios up to about 0.75 resulted in lithiated manganese oxide comprising a substantially single phase of $Li_xMn_yO_4$, while from higher Li/Mn precursor ratios the resultant lithiated manganese oxide comprised a mixture of $Li_xMn_yO_4$ and $Li_2MnO_3$. Thus, in a preferred embodiment of the present invention the Li/Mn precursor ratio ranges from about 0.45 to about 0.75 in order to obtain the substantially single phase material.

EXAMPLE 4

Figure 7:
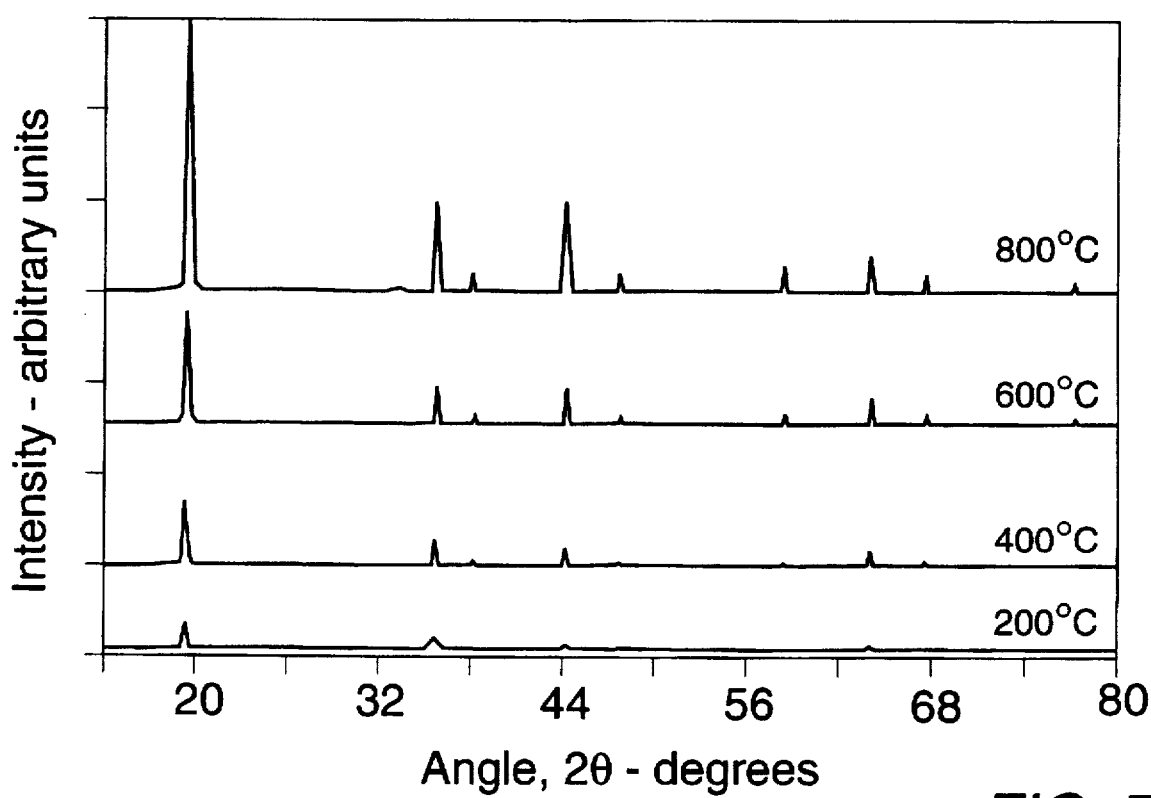
FIG. 7 presents the X-ray diffraction patterns using CuKα radiation for a lithiated manganese oxide precursor heated to maximum temperatures of about 200° C., about 400° C., about 600° C., and about 800° C., respectively.

To examine further the chemical and physical transformation of the lithiated manganese oxide precursor during the second-stage heat treatment, the materials obtained after heating at various temperatures were analyzed by means of X-ray diffraction using CuKα radiation. Portions of a $LiOH \cdot H_2O/MnO_2$/ethylene glycol precursor composition prepared as in Example 1 and having a Li/Mn ratio of 0.63 were heated in air at a rate of about 20° C./hour to respective temperatures of about 200° C., 400° C., 600° C., and 800° C. and were maintained at those temperatures for about 24 hours before being cooled to room temperature at a rate of about 1° C./minute. The resultant lithiated manganese oxides were then analyzed for final Li/Mn ratio, which varied insignificantly at 0.59, 0.60, 0.62, and 0.61, respectively, and were characterized by means of X-ray diffraction (XRD). The resulting XRD patterns depicted in FIG. 7 indicate that while the heating operation has little effect upon the Li/Mn ratio, the structure of the material is altered dramatically.

Figure 8:
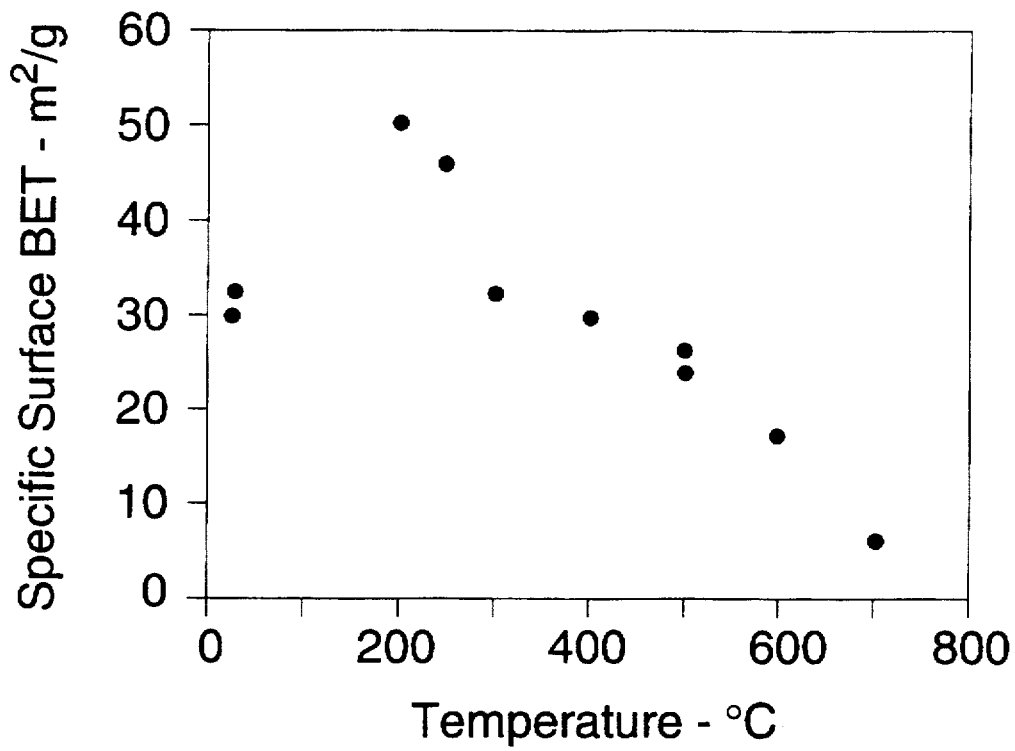
FIG. 8 is a graph illustrating the changes in the BET specific surface area of the lithiated manganese oxide precursor during the heat treatment.
Figure 9:
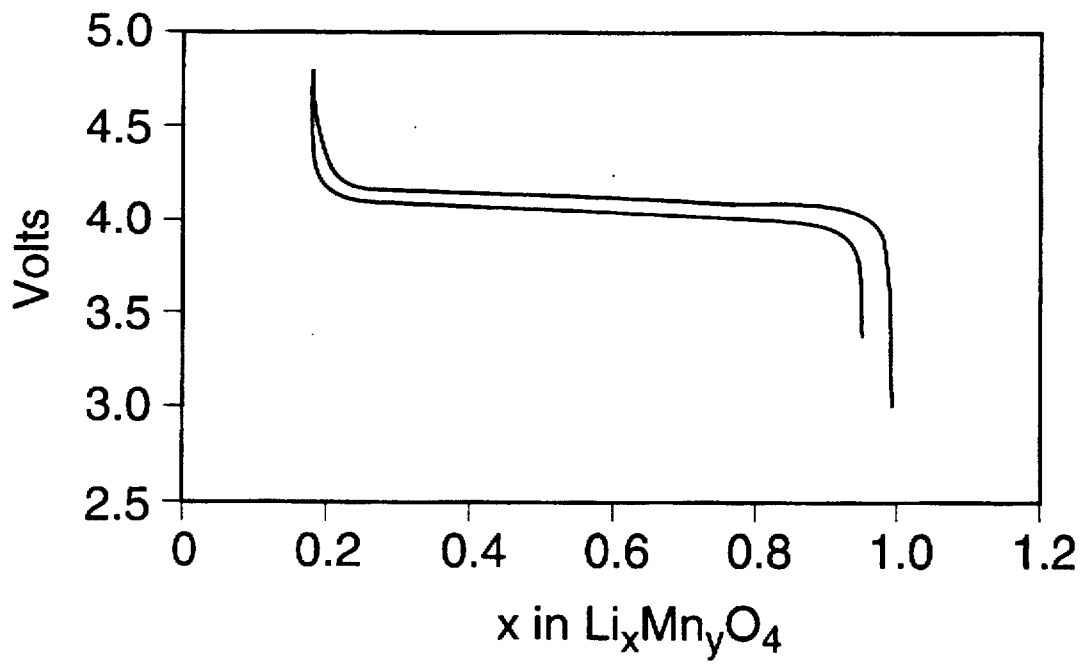
FIG. 9 is a graph illustrating the irreversible component of self-discharge at 25° C. of a secondary cell containing the $Li_{1.09}Mn_{1.91}O_4$ material produced by the process of the present invention.

Concurrent BET analysis of the lithiated manganese oxide precursor during the second-stage heating operation indicates that the specific surface area of the processed precursor material, as depicted in FIG. 8, decreases dramatically during heating. The contrary indication at about 200° C. would be consistent with the combustion which is believed to occur at this temperature. Nonetheless, the $Li_xMn_yO_4$ material, wherein $0 < x \leq 2$ and $1.7 \leq y \leq 2$, produced by the process of the present invention generally exhibits a specific surface area which is about 20% greater than that of such material produced by a conventional process. In addition, the material produced by the process of the present invention exhibits a more porous consistency as observed from scanning electron micrographs. This greater porosity appears to substantially reduce the length of the cooling period required during processing and also enhances the performance of the material as the active component of a positive electrode in a secondary battery cell. As reflected in FIG. 9 showing the first charge/discharge cycle at 25° C. of a secondary cell containing $Li_{1.09}Mn_{1.91}O_4$ material produced by the process of the present invention, the irreversible component, Δx, of self-discharge amounts to only about 0.05. Further, the capacity of the cell over the course of 200 cycles at 25° 0C. exhibits a decrease of only about 7.7%.

The economies in time and energy consumption realized in the present process, as compared with the conventional process of the prior art, demonstrates the effectiveness of the invention. The repeated sequences of heating, cooling, and grinding required in the conventional synthesis of $Li_xMn_yO_4$ can easily consume up to 350 hours, of which about 160 hours are expended in heating and maintaining the reactants at 800° C. or greater. In sharp contrast, the process of the present invention consists of two stages in which the synthesis of a lithiated manganese oxide precursor requires only about 17 hours in a refluxing polyhydric alcohol at a relatively moderate 160° C. and in which the heat treatment of the precursor consumes about 80 hours of which only about 35 hours are at a temperature up to 800° C. Thus, the entire process of preparing a higher quality and more useful $Li_xMn_yO_4$ intercalation compound according to the present invention takes about 95 hours, as compared with the 350 hours required by the conventional solid state process.

What is claimed is:

1. A process for making a $Li_xMn_yO_4$ intercalation compound wherein $0 < x \leq 2$ and $1.7 \leq y \leq 2$ characterized in that said process comprises:
    a) synthesizing a lithiated manganese oxide precursor by reacting lithium hydroxide, manganese dioxide, and at least one polyhydric alcohol; and
    b) subjecting said lithiated manganese oxide precursor to a heat treatment to yield said intercalation compound.

2. A process according to claim 1 wherein said at least one polyhydric alcohol is selected from the group consisting of ethylene glycol, 1,3-propanediol, 1,2-propanediol, glycerol, and pentaerythritol.

3. A process according to claim 1 wherein the precursor synthesis reaction is effected at a temperature of about 160° C. for a period of time ranging from about 10 hours to about 25 hours.

4. A process according to claim 3 wherein the precursor Li/Mn ratio ranges from about 0.45 to out 0.75.

5. A process according to claim 1 characterize in that said heat treatment comprises:
    a) in a first step, increasing the temperature of said precursor from about 20° C. to about 250° C. and maintaining said precursor at about 250° C. for a first period of time;
    b) in a second step, increasing the temperature of said precursor from about 250° C. to about 800° C. and maintaining said precursor at about 800° C. for a second period of time; and
    c) in a third step, decreasing the temperature of said precursor to about 20° C.

6. A process according to claim 5 wherein the temperature is increased in said first step at a rate ranging from about 5° C./hour to about 15° C./hour.

7. A process according to claim 6 wherein the temperature is maintained in said first step for period of time ranging from about 5 hours to about 15 hours.

8. A process according to claim 5 wherein the temperature is increased in said second step at a rate ranging from about 0.5° C./minute to about 2° C./minute.

9. A process according to claim 8 wherein the temperature is maintained in said second step for a period of time ranging from about 20 hours to about 30 hours.

10. A process according to claim 5 wherein the temperature is decreased in said third step at a rate ranging from about 0.5° C./minute to about 2° C./minute.

11. A lithiated manganese oxide precursor synthesized by reacting lithium hydroxide, manganese dioxide, and at least one polyhydric alcohol characterized in that a) the X-ray diffraction pattern of said precursor comprises a predominant 001 line having a peak at the 2Θ angle of about 10° and subsidiary 002 and 003 lines having peaks at about 21° and 32°, respectively; and b) the infrared spectrum of said precursor comprises $CH_2$ stretching in the 2800 to 2950 $cm^{-1}$ region and C—C and C—O stretching in the 1000 to 1100 $cm^{-1}$ region.

12. A precursor according to claim 11 wherein said at least one polyhydric alcohol is selected from the group consisting of ethylene glycol, 1,3-propanediol, 1,2-propanediol, glycerol, and pentaerythritol.

13. A precursor according to claim 11 wherein the precursor synthesis reaction is effected at a temperature of about 160° C. for a period of time ranging from about 10 hours to about 25 hours.

14. A precursor according to claim 13 wherein the Li/Mn ratio ranges from about 0.45 to about 0.75.

* * * * *